United States Patent

[11] 3,585,894

| [72] | Inventor | Fred Brown |
| | | Chicago, Ill. |
| [21] | Appl. No. | 829,528 |
| [22] | Filed | June 2, 1969 |
| [45] | Patented | June 22, 1971 |
| [73] | Assignee | Union Tank Car Company |
| | | Chicago, Ill. |

[54] SELF-DRILLING AND TAPPING SCREW WITH LEAD UNIT
5 Claims, 4 Drawing Figs.

[52] U.S. Cl. ..................... 85/41,
77/62, 85/1, 85/50, 287/189.36 F
[51] Int. Cl. ..................... F16b 23/00
[50] Field of Search ..................... 85/41, 47,
50, 1, 1 JP; 145/129; 77/62 B, 55 G, 55 S;
287/189.36 F

[56] References Cited
UNITED STATES PATENTS

| 1,782,293 | 11/1930 | Elliott | 85/50 |
| 1,962,241 | 6/1934 | Hawkinson | 77/55 G |
| 2,666,354 | 1/1954 | Dim et al. | 85/1 JP |
| 2,700,905 | 2/1955 | Urquhart | 77/55 S |
| 2,761,347 | 9/1956 | McKee | 85/1 JP |
| 2,983,534 | 5/1961 | Heller et al. | 85/1 JP |
| 3,288,015 | 11/1966 | Hanneman | 85/47 |
| 3,300,173 | 1/1967 | Kennedy | 85/50 |
| 3,318,182 | 5/1967 | Carlson | 85/41 |
| 3,355,205 | 11/1967 | Wagner et al. | 85/41 |
| 3,491,972 | 1/1970 | Townshend | 85/50 |

FOREIGN PATENTS

| 690,269 | 4/1953 | Great Britain | 85/41 |

Primary Examiner—Marion Parsons, Jr.
Attorney—Charles M. Kaplan

ABSTRACT: A self-drilling and tapping screw assembly comprising a screw with a threaded section and an end drilling section. The drilling section is embedded in a lead unit which includes a thin metal backup washer, a thin rubberlike surface sealing washer and a relatively thicker, smaller diameter, thread sealing washer. The drilling point of the drilling section extends to adjacent a contact surface of the thicker washer.

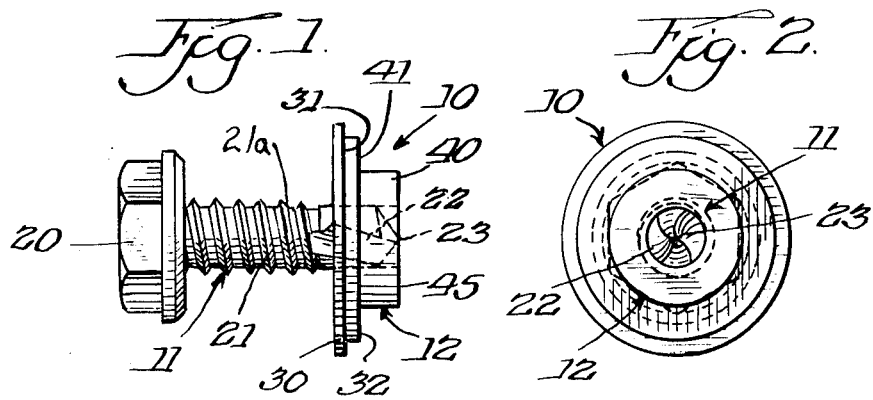
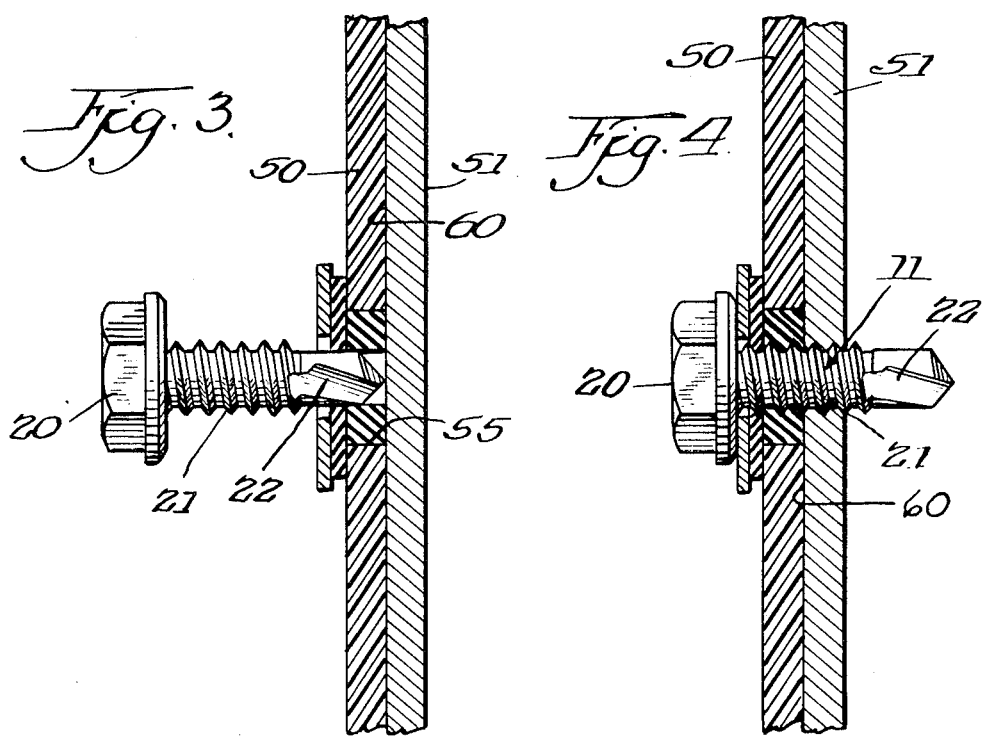
Inventor.
Fred Brown.
By Hume, Clement, Hume & Lee
Attys.

3,585,894

SELF-DRILLING AND TAPPING SCREW WITH LEAD UNIT

BACKGROUND OF THE INVENTION

This invention relates in general to fastening means. It deals more particularly with self-drilling and tapping screws.

Self-drilling and tapping screws are, in general, well-known. However, the conventional self-drilling and tapping screw is not always easy to use. It has a tendency to "walk" away from its intended insertion point in a metal member, for example, into which it is being driven as rotation of the screw by a fastener tool is initiated. Unless a punch mark is first made in the metal, it is difficult to prevent such "walking" of the screw.

SUMMARY OF THE INVENTION

A primary object of the present invention is to provide a self-tapping and drilling screw which positively locates itself on the sheet metal, for example, into which it is being driven. It is another object to provide a self-drilling and tapping screw which does not have a tendency to "walk" away from its intended point of insertion as rotation of the screw is initiated. Still another object is to provide a screw of the aforedescribed character which is, in addition, self-sealing so that moisture leakage through the small openings around the screw threads is prevented. It is yet another object to provide a simple, inexpensive, self-drilling and tapping screw which accomplishes these ends in a single drilling, tapping, and seating operation.

The foregoing and other objects are realized in accord with the invention by providing a self-drilling and tapping screw assembly including a conventional self-drilling and tapping screw and a lead unit preassembled with the drill section of the screw imbedded in the lead unit in a prescribed manner. The lead unit comprises a steel washer having a predetermined diameter. A rubber washer having a diameter slightly less than the diameter of the steel washer is bonded to one face of the steel washer in concentric relationship therewith by vulcanizing or with a suitable bonding adhesive. This washer, which is preferably fabricated of Neoprene, has a thickness substantially identical to the thickness of the steel washer. Adjacent the opposite face of the Neoprene washer is a thicker washer also fabricated of rubber or the like, preferably Neoprene. The thicker washer might be separate or it might be bonded to the thinner washer.

The steel washer has an inside diameter slightly larger than the outside diameter of the screw threads. The rubber washers, on the other hand, have inside diameters slightly smaller than the outside diameter of the drilling section of the screw. This drilling section of the screw is force-fit into the rubber washers through the steel washer to the extent that its point is flush with the plane of the free face of the thicker rubber washer. The lead unit and self-drilling and tapping screw are thus preassembled, according to the invention, for use in fastening sheet plastic, wood, metal, or composites or the like to a backing material.

BRIEF DESCRIPTION OF THE DRAWING

The invention, both as to its construction and method of operation, taken with further objects and advantages thereof, is illustrated more or less diagrammatically in the drawing, in which:

FIG. 1 is a side elevational view of a self-drilling and tapping screw assembly embodying features of the invention;

FIG. 2 is an end elevational view of the self-drilling and tapping screw assembly illustrated in FIG. 1, taken from the lead unit end of the screw assembly;

FIG. 3 is a side elevational view, partially in section, of the self-drilling and tapping screw assembly seated in position to fasten a plastic sheet such as a sign or the like to a sheet metal backing member; and FIG. 4 is a view similar to FIG. 3 illustrating the screw assembly in fastening relationship.

DESCRIPTION OF THE PREFERRED EMBODIMENT

Referring now to the drawing, and particularly to FIGS. 1 and 2, a self-tapping and drilling screw assembly embodying features of the invention is illustrated generally at 10. The screw assembly 10 includes a standard self-drilling and tapping screw 11 preassembled with a screw lead unit 12 according to the invention.

The standard self-drilling and tapping screw 11 comprises, in the present illustration, a hexagonal head, cadmium plated steel screw. The screw 11 includes the hexagon head 20 and a threaded section 21 extending therefrom. The first few threads 21a of the section 21 are hardened to act as tapping threads. Extending coextensively from the threaded section 21 of the screw 11 is the drilling section 22. The drilling section 22 terminates in a drilling point 23 at the end of the screw 11.

The screw lead unit 12 is snugly seated over the drilling section 22 of the screw 11. The lead unit 12 includes, in its preferred form, a steel washer 30 having an outside diameter slightly larger than the outside diameter of the screw head 20, and an inside diameter slightly larger than the outside diameter of the threaded section 21. Accordingly, the steel washer 30 slides easily over the drilling section 22 in the manner illustrated in FIG. 1.

Bonded to the outer face 31 of the steel washer 30 is a washer 32 fabricated of rubber or the like. In the present illustration, the washer 32 is the synthetic rubber, Neoprene. It is vulcanized or bonded to the steel plate 31 with any of numerous suitable adhesives.

The outside diameter of the Neoprene washer 32 is slightly smaller than the outside diameter of the steel washer 30. The inside diameter of the Neoprene washer 32 is, however, also slightly smaller than the outside diameter of the drilling section 22 of the screw 11. As such, it fits snugly over the drilling section 22, gripping it tightly.

Similarly, another washer 40 fabricated of a synthetic rubber or the like such as Neoprene is positioned free of but adjacent the outer surface 41 of the Neoprene washer 32. In the alternative, the washers 32 and 40 might be bonded together or formed unitarily. The washer 40 is substantially thicker than the washer 21 and, in addition, substantially smaller in outside diameter. The outside diameter of the washer 40 is, in fact, preselected to conform to the diameter of predrilled holes in the sheet material which is to be fastened to sheet metal backing, for example, in a manner hereinafter discussed in detail.

The inside diameter of the washer 40 corresponds to the inside diameter of the washer 32 and is slightly smaller than the outside diameter of the drilling section 22 on the screw 11. Thus, when the screw 11 is forced into the washers 32 and 40, through the steel washer 30 in the manner illustrated in FIG. 1, a tight interference fit is established between the rubber washers and the drilling section 22 of the screw 11. The screw assembly 10 is assembled in this manner and the screw 11 is forced through the Neoprene washers 32 and 40 until its drilling point 23 is flush with the plane of the outer surface 45 on the washer 40.

The self-drilling and tapping screw assembly 10 is thus assembled in accord with the invention. Turning to FIGS. 3 and 4, the screw assembly 10 is illustrated, first in position to be driven into seated relationship (FIG. 3), and second, after being seated (FIG. 4), fastening a sheet 50 such as a plastic sign or the like, to a metal sheet member 51 which acts as a support for the sign 50.

In order to fasten a plastic sheet sign 50, for example, to a sheet steel member 51 backing, for example, with the self-drilling and tapping screw assembly 10 embodying features of the invention, suitably positioned apertures 55 are first punched or drilled in any well-known manner in the plastic sheet 50. The apertures 55 are formed with a diameter slightly larger than the outside diameter of the large Neoprene washer 40 of the lead unit 12 the self-drilling and tapping screw assembly 10.

The thickness of the washer 40 is equal to or slightly greater than the thickness of the plastic sheet 50. Accordingly, when the screw assembly 10 is seated in placed with the washer 40 bottomed in the recess formed by the aperture 55 in the plastic sheet 50, the thinner rubber washer 32 seats on or is spaced only a slight distance from the face of the plastic sheet. The washer 40 bottoms snugly in this aperture 55 so that the drilling point 23 of the drilling section 22 on the screw 11 is seated flush against the surface 60 of the sheet metal member 51.

The screw assembly 10 is now in position to be driven into the seated relationship illustrated in FIG. 4. A suitable tool (not shown) is placed over the hexagonal head 20 of the screw 11 to rotate the screw. The washer 40, in frictional engagement with the surface 60 of the sheet metal member 51, maintains the drilling section 22 of the screw 11 in centered relationship in the aperture 55 so that the drilling point 23 cannot walk. Accordingly, the screw 11 drills and then taps into the plate 51 in perfectly centered relationship in the aperture 55.

As the screw 11 is turned tight on its threaded section 21 in the member 51, the washer 40 is compressed. It fills all the tiny crevices in the threaded section 21 of the screw 11 which it surrounds. The washer 32 is compressed against the plastic plate 50 by the hexagonal head 20 of the screw acting on the steel washer 30, providing a further sealing of the threads from the sign surface. At the same time, the washer 40 compressed against the surface 60 on the member 51 additionally seals the threads 21 from outside environment access through the sign 50 and sheet member 51 interface.

I claim:

1. In combination, a self-drilling and tapping screw assembly securing a first member, having an aperture therein, to a second member comprising:
   a. a screw having a threaded section and a drilling section;
   b. a drilling point at the free end of said drilling section; and
   c. a drilling lead unit seated on said drilling section;
   d. said lead unit including resilient means through which said drilling section extends;
   e. said resilient means comprises annular rubber washer means, said annular rubber washer means includes a first washer section having an outside diameter substantially equal to the diameter of said aperture in said first member and a thickness equal to or slightly greater than the thickness of said first member and a second washer section having a larger diameter than said first washer section;
   f. said first washer section having a contact surface and said drilling point being disposed in said resilient means adjacent to said contact surface.

2. The self-drilling and tapping screw assembly of claim 1 further characterized in that:
   a. said first washer section has a generally planar contact surface at the free end thereof; and
   b. said drilling point being disposed substantially at said planar contact surface.

3. The self-drilling and tapping screw assembly of claim 1 further characterized in that:
   a. said tapping lead unit includes a metal washer bonded to said second washer section.

4. The self-drilling and tapping screw assembly of claim 3 further characterized in that:
   a. said metal washer has an outside diameter at least as large as said second washer section outside diameter, and an inside diameter larger than the inside diameter of said first and second washer sections.

5. The self-drilling and tapping screw assembly of claim 1 further characterized in that:
   a. the inside diameter of said first and second washer sections are less than the outside diameter of said drilling section and less than the outside diameter of said threaded section.